(12) United States Patent
Dharmarajan

(10) Patent No.: US 7,533,260 B2
(45) Date of Patent: *May 12, 2009

(54) METHOD AND APPARATUS FOR ENCODING AND STORING SESSION DATA

(75) Inventor: Baskaran Dharmarajan, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/313,543

(22) Filed: Dec. 20, 2005

(65) Prior Publication Data

US 2006/0129648 A1 Jun. 15, 2006

Related U.S. Application Data

(62) Division of application No. 09/650,104, filed on Aug. 29, 2000, now Pat. No. 7,010,605.

(51) Int. Cl.
*H04L 9/00* (2006.01)
*G06F 15/16* (2006.01)
(52) U.S. Cl. .................. 713/162; 709/227
(58) Field of Classification Search .............. None
See application file for complete search history.

(56) References Cited

U.S. PATENT DOCUMENTS

| 5,367,573 | A | 11/1994 | Quimby |
| 5,623,546 | A | 4/1997 | Hardy et al. |
| 5,689,565 | A * | 11/1997 | Spies et al. ............. 713/189 |
| 6,041,357 | A | 3/2000 | Kunzelman et al. |
| 6,374,359 | B1 | 4/2002 | Shrader et al. |
| 6,557,038 | B1 | 4/2003 | Becker et al. |

* cited by examiner

*Primary Examiner*—Brandon S Hoffman
(74) *Attorney, Agent, or Firm*—Senniger Powers LLP

(57) ABSTRACT

Session data is encoded in a tag-length-value format and encrypted using a modified encryption key. A session cookie is then formed by concatenating the length of the length of the secret, the length of the secret, the secret itself, and the encoded and encrypted configuration data. The session cookie is transmitted from a server computer to a client computer, where it is stored.

6 Claims, 10 Drawing Sheets

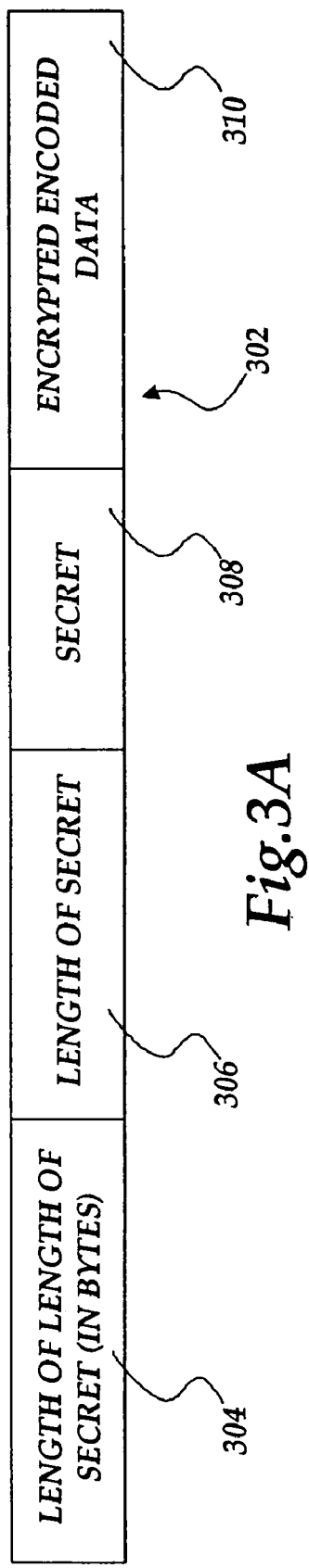
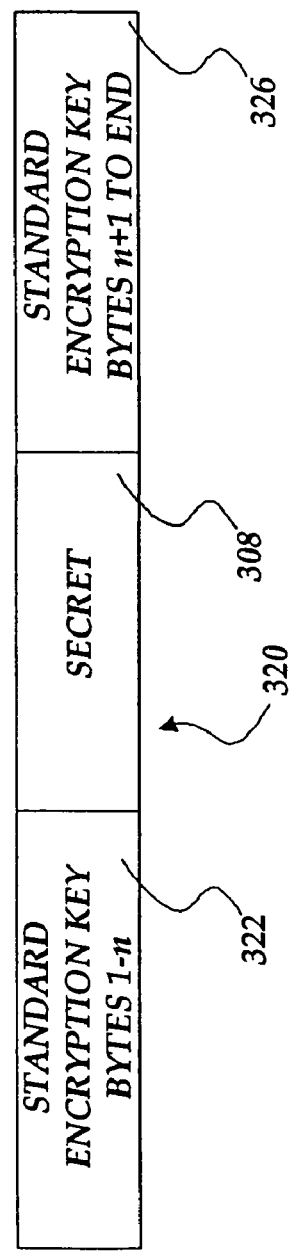
Fig.3A
Fig.3B

METHOD AND APPARATUS FOR ENCODING AND STORING SESSION DATA

CROSS-REFERENCE TO RELATED APPLICATION

This application is a divisional of Ser. No. 09/650,104 now U.S. Pat. No. 7,010,605, filed Aug. 29, 2000, priority from the filing date of which is hereby claimed under 35 U.S.C. § 120.

FIELD OF THE INVENTION

This invention generally relates to the field of distributed computer systems and, more specifically, relates to a method and apparatus for encoding session data utilized by a server computer, and storing such data on a client computer.

BACKGROUND

The World Wide Web ("Web" or "WWW") is a vast collection of interconnected or "hypertext" documents written in HyperText Markup Language ("HTML"), or other markup languages, that are electronically stored at "Web sites" throughout the Internet. A Web site is a server computer connected to the Internet that has mass storage facilities for storing hypertext documents and that runs administrative software for handling requests for those stored hypertext documents. Large-scale Web sites are typically implemented utilizing a two-tier computer systems architecture. The first tier typically comprises a "front-end" Web server computer that receives and processes live requests for Web pages from client computers connected to the Internet. The second tier of the typical large-scale Web site is a "back-end" server computer that stores the Web pages to be served by the front-end server computer. When a request is received at the front-end server computer for a Web page, the front-end server computer retrieves the requested Web page from the back-end server computer and provides the requested page to the requesting client computer. A large degree of efficiency is obtained by separating the front-end server computer that receives the live Web requests from the back-end server computer that stores the available Web pages.

Many large-scale Web sites also store other data at the back-end server computers in addition to the actual Web pages. For instance, a back-end server computer may store Web session data that describes how Web pages delivered to a particular user should be formatted by the front-end server computer. When a request is received from a user, the front-end server computer requests the session data pertaining to the requesting user from the back-end server computer. The back-end server computer then delivers the requested session data to the front-end computer. The front-end server computer may then use the session data to format Web pages requested by the user in the manner preferred by the user. Storing session data at the back-end server computer is advantageous because it allows this data to be accessed by any front-end server computer at which a request from the user is received.

Another advantage of storing session data on a back-end server computer accessible to a front-end server computer is realized when a load balancing mechanism is utilized. A load balancing mechanism receives live Web page requests from client computers and evenly directs the Web page requests from the client computers to a number of available front-end server computers. While the use of such a load balancing mechanism evenly distributes network traffic among many front-end server computers, such a mechanism also makes it difficult to determine which front-end server computer a request will be received at. By storing session data at a back-end server computer accessible to each of the front-end server computers, each of the front-end server computers can utilize this information when responding to Web page requests without storing the information locally.

While storing session data utilized by a front-end server computer on a back-end server computer has its advantages, such a system is not without its drawbacks. The primary drawback of such a system is that many requests from front-end server computers to back-end server computers can quickly consume much of the available network bandwidth between the front- and back-end server computers. Popular Web sites currently receive hundreds of millions of page requests per month. Transmission of the session data associated with such a large number of page requests from the back-end server computers to the front-end server computers can exhaust a large portion of even the highest bandwidth network connection before a single Web page has been transferred. To reduce the volume of communication between the front- and back-end server computers, many large Web sites turn to the use of persistent client objects, otherwise known as "cookies," to store session data.

A cookie is a block of data that a Web server stores on a client computer system. When a user returns to the same Web site that stored the cookie, the Web browser application program sends a copy of the cookie back to the server. The cookie can then be utilized by the Web server computer to identify the user, to create a version of the requested Web page customized for the user, to identify account information for the user, or for other administrative purposes. Because cookies are stored on the client computer, the bandwidth used by the communication between the front- and back-end server computers in transmitting session data is eliminated. However, although using cookies to transmit session data from a client computer to a server computer does reduce back-end bandwidth usage, cookies are not without a number of serious drawbacks.

The biggest drawback of using cookies as a means for transferring Web server session data is that the relatively low bandwidth connection between the client computer and the front-end server computer requires that the cookies be very small. Because the size of the cookies must be small, the amount of useable data that may be transferred from the client computer to the server computer in a single cookie is minimal. Another drawback to using cookies stems from the fact that cookies are transmitted in the open from the client computer to the server computer. Because cookies are transmitted in the open over the Internet, there is a possibility that the cookies may be intercepted by an unauthorized recipient. An intercepted cookie may then be "replayed" by the unauthorized recipient to gain improper access to the Web server. The use of cookies may also be undesirable because the data encoding scheme utilized by previous systems for creating cookies have not been forward and backwardly compatible with future and previous versions of the Web server application software. Therefore, if additional data items are added to the data encoded in a cookie, previous or future versions of the Web server application software may misunderstand the encoded data when the cookie is received from the client computer and decoded.

Accordingly, in light of the above problems, there is a need for a method and apparatus for encoding and storing session data that minimizes the amount of data transferred between the client and server computers while maximizing the amount of information encoded in the transferred data. There is a further need for a method and apparatus for encoding and storing session data that can store such session data on a client computer and transmit the data to a server computer in a manner that minimizes the likelihood that the data could be utilized by an unauthorized recipient. Furthermore, there is a need for a method and apparatus for encoding and storing session data that utilizes a data encoding format that is forward and backward compatible with previous and future versions of Web server application software.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention solves the above problems by providing a method and apparatus for encoding and storing session data that minimizes the amount of data transferred between a client computer and a server computer while maximizing the amount of configuration information transferred. Additionally, the present invention provides a method and apparatus for encoding and storing session data that encodes and encrypts the session data in a manner that reduces the likelihood that an unauthorized recipient may utilize the data. Furthermore, the present invention advantageously provides a method and apparatus for encoding and storing session data that provides forward and backward compatibility with previous and future versions of Web server application software.

Generally described, the present invention encodes and stores session data in an encoded and encrypted session cookie. As described above, a cookie is a block of data that a server computer may store on a client computer. When a communications session is initiated between the client computer and the server computer that stored the cookie, the client computer sends a copy of the cookie back to the server. The present invention provides a method and apparatus for encoding session data in the session cookie that is forwardly and backwardly compatible, that maximizes that amount of session data transmitted, and that virtually eliminates the possibility of unauthorized access to the data contained in the session cookie. These advantages are not found in previous methods and systems for encoding data into cookies.

More specifically described, the present invention provides a server computer that encodes session data into a session cookie in a tag-length-value format. Session data is configuration data that is utilized by a server computer to configure itself for a particular user communications session. A tag-length-value format encodes data by providing a tag identifying the semantic information that a value represents, the length of the value, and then the value itself. By utilizing a tag-length-value format, a large amount of session data may be represented in a small amount of space. Once the session data has been encoded in the tag-length-value format, the server computer encrypts the encoded session data using a modified encryption key. The modified encryption key may be formed by inserting a secret, such as the user's password or e-mail address, into a standard encryption key at a predefined location. A time stamp may also be included with the encrypted configuration data to ensure that the results of the encryption are different each time. The session cookie is then formed by concatenating the length of the length of the secret, the length of the secret, the secret itself, and the encoded and encrypted session data. The session cookie is then transmitted from the server computer to a client computer, where it is stored.

Each time the client computer begins a new communications session with the server computer that generated the session cookie, the session cookie is transmitted from the client computer to the server computer. The server computer receives the session cookie from the client computer and extracts the secret stored in the session cookie. The server computer then creates the modified encryption key by inserting the secret into the standard encryption key at the predefined location. The server computer then utilizes the modified encryption key to decrypt the encoded session data stored in the session cookie.

Once the encoded configuration data has been decrypted, the server computer decodes the tags contained in the encoded configuration data. For each tag, the server computer determines whether the tag is recognized as a valid tag. If the tag is a valid tag, the server computer utilizes the value associated with the tag to configure itself for the communications session. For instance, the server computer may utilize a tag corresponding to the communication language to configure itself to respond to requests in Japanese. If the tag is not a valid tag, the server computer ignores the tag and attempts to decode the next tag. By ignoring invalid tags, the server computer may configure itself using session cookies generated by previous or future versions of the server operating system software. The server computer continues this process until no tags remain to be decoded.

According to an embodiment of the present invention, the server computer generates a new session cookie once it has finished decoding the tags contained in the session cookie. The server computer transmits the new session cookie to the client computer. The server computer also starts a session timer when the new session cookie is transmitted. The session timer indicates the length of time since the new session cookie was transmitted from the server computer to the client computer. Periodically, the server computer may check the session timer to see if a predetermined amount of time has elapsed. If the predetermined amount of time has elapsed, the server computer transmits a request to the client computer for the new session cookie. In response, the client computer transmits the new session cookie to the server computer.

The server computer receives the session cookie from the client computer and decrypts and decodes the encoded session data. If the session cookie is valid, the server computer creates a new session cookie, transmits it to the client computer, and resets the session timer. If the session cookie is not valid, or if no response is received from the client computer, the server computer understands that the communications session with the client computer has ended and closes the connection. The present invention also provides an method, apparatus, and computer-readable medium for encoding and storing session data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a block diagram illustrating a data structure for a session cookie utilized in an actual embodiment of the present invention.

FIG. 3B is a block diagram illustrating a data structure for a modified encryption key utilized in an actual embodiment of the present invention.

DETAILED DESCRIPTION

Figure 1:
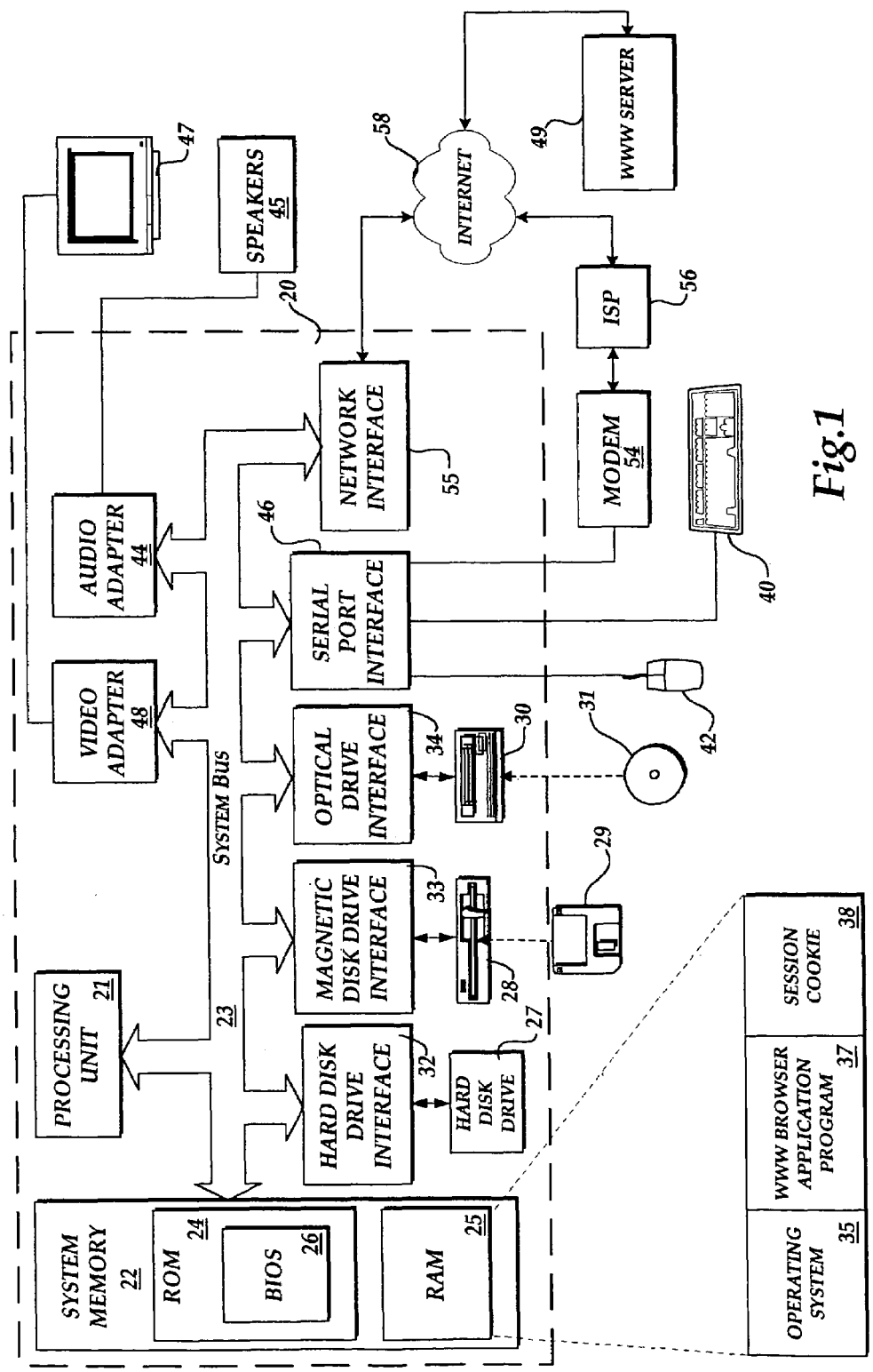
FIG. 1 is a block diagram illustrating a client computer utilized in an actual embodiment of the present invention.

The present invention is directed to a method and apparatus for encoding and storing session data. Briefly described, the invention provides a method and apparatus for encoding session data in a session cookie that may be stored on a client computer. According to an embodiment of the invention, the server computer may encode and encrypt session data in the session cookie. When a communications session is first initiated between the server computer and a client computer, the server computer encodes and encrypts session data in the session cookie. The server computer then transmits the session cookie to the client computer.

When a subsequent communications session is initiated between the client computer and the server computer, the client computer transmits the session cookie to the server computer. The server computer receives the session cookie, decrypts and decodes the session data contained in the session cookie, configures itself using the session data, and responds to requests from the client computer using the configuration. As will be described in more detail below, the server computer may also utilize the session cookie to periodically validate the communications session between the server computer and the client computer.

According to an actual embodiment of the present invention, the session data is encoded by the server computer. The encoded session data, of configuration data, is then encrypted using a modified encryption key. The modified encryption key is created by inserting a secret, such as a user password, into a standard encryption key at a predetermined location. The session cookie is then formed by concatenating the length of the length of the secret, the length of the secret, the secret itself, and the encrypted and encoded session data. The format of the modified encryption key and the format of the session cookie are described in more detail below with reference to FIGS. 3A and 3B.

The server computer encodes the session data in a tag-length-value format. Using such a format, different types of server configuration data are assigned to different tags. For instance, a tag may be assigned to represent a server configuration parameter identifying the number of lines of data per page that the server computer should transmit to the client computer. The tag portion of the configuration data is therefore used to identify the particular tag to which the following value data applies. The length field describes the length of the value associated with the tag. The value field specifies the particular value that is associated with the tag and has a length specified by the length field. For example, a complete tag may indicate that the value associated with the tag is a configuration parameter describing the number of lines per page, the length may indicate that the value is two bytes long, and the value may be set at "66." The server computer can then use this tag-length-value to configure itself to transmit 66 lines per page to the client computer.

According to an actual embodiment of the invention, each tag is two bytes long and includes a data length identifier and a tag type. The data length identifier comprises the first two bits of the tag and explicitly describes the length of the encoded data. According to an embodiment of the invention, the data length identifier may represent data that is one byte long, four bytes long, an octet string, or an extended tag type value. If the data length identifier is specified as one or four bytes, no length field is provided as the data length is explicit and is therefore already known. If the data length identifier is specified as an octet string, the data length field indicates the number of bytes in the octet string. If the data length identifier is specified as an extended tag type value, the remaining bits in the tag describe the number of bytes in the next tag. The next tag is then encoded in a similar format. The tag, data length, and the data value are concatenated to form an encoded data string. Subsequent data is encoded in a similar manner and concatenated to the same string. The tag-length-value encoding format used by the present invention is described in more detail below with reference to FIGS. 4 and 5.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Referring now to FIG. 1, an illustrative client computer 20 will be described. As described briefly above, the client computer 20 initiates a communications session with a server computer, such as Web server 49. Typically, the communications session is initiated in response to a request for a resource, like a WWW page, located at Web server 49. The client computer 20 may make such a request through WWW browser application program 37, such as Microsoft® Internet Explorer. When the communications session is initiated, the Web server 49 may request a session cookie 38 from the client computer 20. If such a session cookie 38 is stored on the client computer 20, the client computer 20 will transmit the session cookie 38 to the Web server computer 49. If such a session cookie 38 is not stored on the client computer, the Web server 49 may create and transmit a session cookie 38 to the client computer 20 for storage. The Web server 49 may also periodically request the session cookie 38 from the client computer 20. In response, the client computer 20 will transmit the session cookie 38 to the Web server 49.

The client computer 20 comprises a conventional personal computer, including a processing unit 21, a system memory 22, and a system bus 23 that couples the system memory to the processing unit 21. The system memory 22 includes a read only memory (ROM) 24 and a random access memory (RAM) 25. A basic input/output system 26 (BIOS), containing the basic routines that help to transfer information between elements within the client computer 20, such as during start-up, is stored in ROM 24. The client computer 20 further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD"). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the client computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the illustrative operating environment.

A number of program modules may be stored in the drives and RAM 25, including an operating system 35, one or more application programs, and a Web browser application program 37, such as Internet Explorer provided by Microsoft® or Netscape Navigator provided by Netscape, Inc. As will be described in more detail below, the client computer 20 may also store a session cookie 38, comprising configuration data for transmission to a server computer such as Web server 49. The format and use of the session cookie 38 will be described in more detail below with reference to FIGS. 3A-10.

A user may enter commands and information into the client computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, a client computer 20 may include other peripheral output devices, such as speakers 45 connected through an audio adapter 44 or printers (not shown).

As described briefly above, the client computer 20 may operate in a networked environment using logical connections to one or more remote computers, such as a Web server computer 49. According to an embodiment of the invention, the client computer 20 and the Web server computer 49 communicate over the Internet 58. The client computer 20 connects to the Internet 58 through a network interface 55. Alternatively, the client computer 20 may include a modem 54 and use an Internet Service Provider ("ISP") 56 to establish communications over the Internet 58. The modem 54, which may be internal or external, is connected to the system bus 23 via the serial port interface 46. It will be appreciated that the network connections shown are illustrative and other means of establishing a communications link between the client computer 20 and the Web server computer 49 may be used.

As is well known to those skilled in the art, the Internet 58 comprises a collection of networks and routers that use the Transmission Control Protocol/Internet Protocol ("TCP/IP") to communicate with one another. The Internet typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as client computer 20, and other related electronic devices can be remotely connected to either the LANs or the WANs via a permanent network connection or via a modem and temporary telephone link. It will be appreciated that the Internet 58 comprises a vast number of such interconnected networks, computers, and routers.

Figure 2:
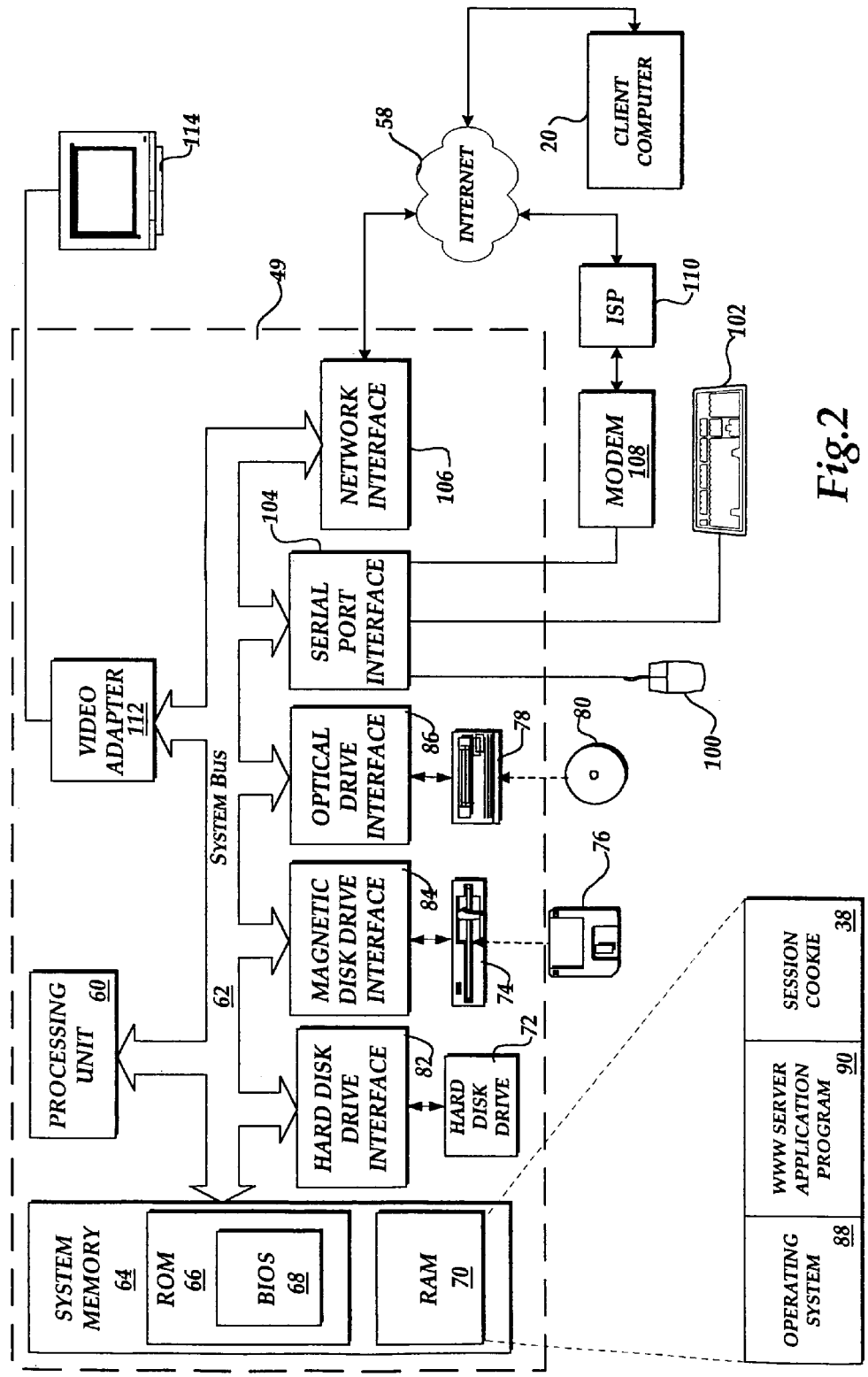
FIG. 2 is a block diagram illustrating a server computer utilized in an actual embodiment of the present invention.

Referring now to FIG. 2, an illustrative Web server computer 49 will be described. As described briefly above, a communications session is initiated over the Internet 58 or other distributed computing network between the Web server computer 49 and the client computer 20. Typically, the communications session is initiated in response to a request for a resource, like a WWW page (not shown), located at the Web server computer 49. When the communications session is initiated, the Web server computer 49 requests a session cookie 38 from the client computer 20. If a session cookie 38 is stored on the client computer 20, the client computer 20 will transmit the session cookie 38 to the Web server computer 49. The Web server computer 49 may then decrypt and decode session data stored in the session cookie 38 and use this information to configure itself. If a session cookie is not stored on the client computer 20, the Web server computer 49 may create and transmit the session cookie 38 to the client computer 20 for storage. The Web server computer 49 may also periodically request the session cookie 39 from the client computer 20. In response, the client computer 20 will transmit the session cookie 38 to the Web server 49.

The Web server computer 49 comprises a general purpose server computer for receiving and responding to HyperText Transfer Protocol ("HTTP") requests. The Web server computer 49 comprises a conventional server computer, including a processing unit 60, a system memory 64, and a system bus 62 that couples the system memory 64 to the processing unit 60. The system memory 64 includes a read only memory (ROM) 66 and a random access memory (RAM) 70. A basic input/output system 68 (BIOS), containing the basic routines that help to transfer information between elements within the Web server computer 49, such as during start-up, is stored in ROM 66. The Web server computer 49 further includes a hard disk drive 72, a magnetic disk drive 74, e.g., to read from or write to a removable disk 76, and an optical disk drive 78, e.g., for reading a CD-ROM disk 80 or to read from or write to other optical media such as a Digital Versatile Disk ("DVD"). The hard disk drive 72, magnetic disk drive 74, and optical disk drive 78 are connected to the system bus 62 by a hard disk drive interface 82, a magnetic disk drive interface 84, and an optical drive interface 86, respectively. The drives and their associated computer-readable media provide nonvolatile storage for the Web server computer 49.

A number of program modules may be stored in the drives and RAM 70, including an operating system 88 suitable for controlling the operation of a server computer, such as Windows NT® or Windows® 2000 from Microsoft®. Additionally, a Web server application program 90 may be stored in RAM 70, like Internet Information Server from Microsoft®. As known to those skilled in the art, the Web server application program 90 is operative to receive HTTP requests through the network interface 106 and to respond to those requests. Typically, an HTTP request will take the form of a request for a page encoded in the Hypertext Markup Language ("HTML"), a graphics file, or another application program stored at the Web server computer 49. As will be described in more detail below, the Web server computer 49 may also generate and store a session cookie 38, comprising configuration data for use by the Web server computer 49. The operation of the Web server computer 49 will be described in more detail below with reference to FIGS. 6-10.

A user may control the operation of the Web server computer 49 through input devices such as a keyboard 102 or a mouse 100. These and other input devices are often connected to the processing unit 60 through a serial port interface 104 that is coupled to the system bus 62, but may be connected by other interfaces, such as a universal serial bus ("USB"). A monitor 114 or other type of display device is also connected to the system bus 62 via an interface, such as a video adapter 112. In addition to the monitor, a Web server computer 49 may include other peripheral output devices, such as a printer (not shown).

Like the client computer 20, described above, the Web server computer 49 may operate in a networked environment. According to an embodiment of the invention, the Web server computer 49 communicates with the client computer 20 over the Internet 58. The Web server computer 49 connects to the Internet 58 through a network interface 106. Alternatively, the Web server computer 49 may include a modem 108 and use an Internet Service Provider ("ISP") 110 to establish a connection to the Internet 58. It will be appreciated that the network connections shown are illustrative and other means of establishing a communications link between the Web server computer 49 and the Internet may be used.

Referring now to FIG. 3A, an illustrative data structure for a session cookie 302 utilized in an actual embodiment of the present invention will be described. The session cookie 302 is formed by concatenating the length of the length of a secret 304, the length of a secret 306, a secret 308, and encrypted and encoded server configuration data 310. The secret 308 may comprise a user password, a user e-mail address, or other type of pre-selected information. The length of the secret 206 describes the number of bytes necessary to represent the secret 206. The length of the length of the secret describes the number of bytes necessary to describe the length of the secret. The format of the encoded configuration data 310 is described below with respect to FIGS. 4 and 5. Those skilled in the art should appreciate that bits, words, or other quantities for expressing data length may be used to describe the length of the secret and the length of the length of the secret.

Referring now to FIG. 3B, an illustrative data structure for a modified encryption key 320 utilized in an embodiment of the present invention will be described. As will be discussed in more detail below with reference to FIG. 7, the encoded configuration data 310 shown in FIG. 3A is encrypted using a modified encryption key 320. The modified encryption key 320 is formed by taking a standard encryption key and inserting the secret 308 into the standard key at a predefined location. For instance, the secret 308 may be inserted into the standard encryption key following the first N bytes of the standard encryption key 322 and before the remaining bytes of the standard encryption key 326. In this manner, a modified encryption key 320 may be formed.

Figure 4:
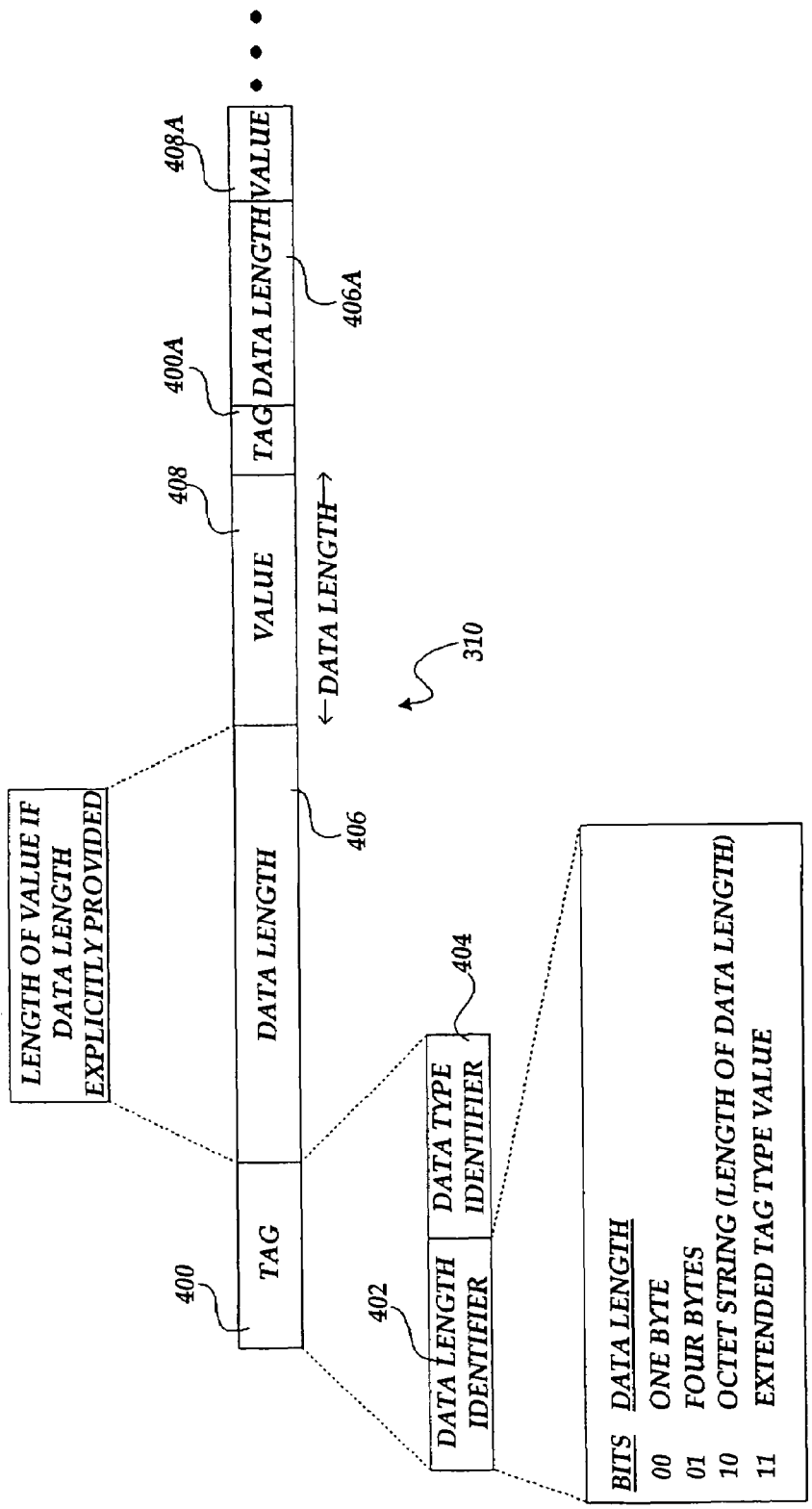
FIG. 4 is a block diagram illustrating a tag-length-value data structure for encoding data in an actual embodiment of the present invention.

Referring now to FIG. 4, an illustrative data structure for encoded server configuration data 310 will be described. As discussed briefly above, the encoded server configuration data 310, or session data, is formatted in a tag-length-value data format. Utilizing this format, a tag 400, a data length 406, and a value 408 are concatenated to together identify one server configuration value. Additional tag-length-value pairs, such as tag 400A, data length 406A, and value 408A, may be concatenated to identify other server configuration values. The tag-length-value pairs may be continually concatenated until each item of server configuration data has been represented.

The tag 400 is formed by concatenating a data length identifier 402 and a data type identifier 404. The data type identifier 404 identifies the type of data represented by value 408. For instance, a data type identifier 404 may be defined corresponding to the number of lines per page that should be transmitted by the server computer. If such a data type identifier 404 is specified, and the value 408 is "66," then 66 lines per page will be transmitted.

The data length identifier 402 may contain one or more bits describing the length of value 408. According to an embodiment of the invention, the data length identifier 402 comprises two bits. If the data length identifier is "00" then the length of value 408 is one byte. If the data length identifier is "01" then the length of the value 408 is four bytes. By assigning bit patterns to frequently used lengths of value 408, the data length field 406 may be omitted. If the length of value 408 is not one of the predefined data lengths, such as "00" or "01," then another bit pattern may be utilized to specify the length of the data length 406. For instance, if the data length identifier 402 is "10" then the data length 406 comprises an octet string specifying the length of the value 408. Additionally, a separate data length identifier 402 may be utilized to specify that an extended tag type value is provided. For instance, if the data length identifier 402 is "11" then the tag is of an extended tag type value. The format of an extended tag type value is described below with reference to FIG. 5.

The value 408 comprises the session data corresponding to the type of configuration parameter specified by the data type identifier 404. Moreover, the value 408 has a length specified either by the data length identifier 402 if an implicit length is specified, or by the data length 406 if an explicit data length is provided. According to an embodiment of the invention, the tag 400 comprises 8 bits. The first two bits of the tag 400 are utilized by the data length identifier 402 and the last six bits are utilized by the data type identifier 404. By utilizing a six bit data type identifier, 26 items (64) of session data may be defined. If additional items of session data must be utilized, then an extended tag type value may be defined.

Figure 5:
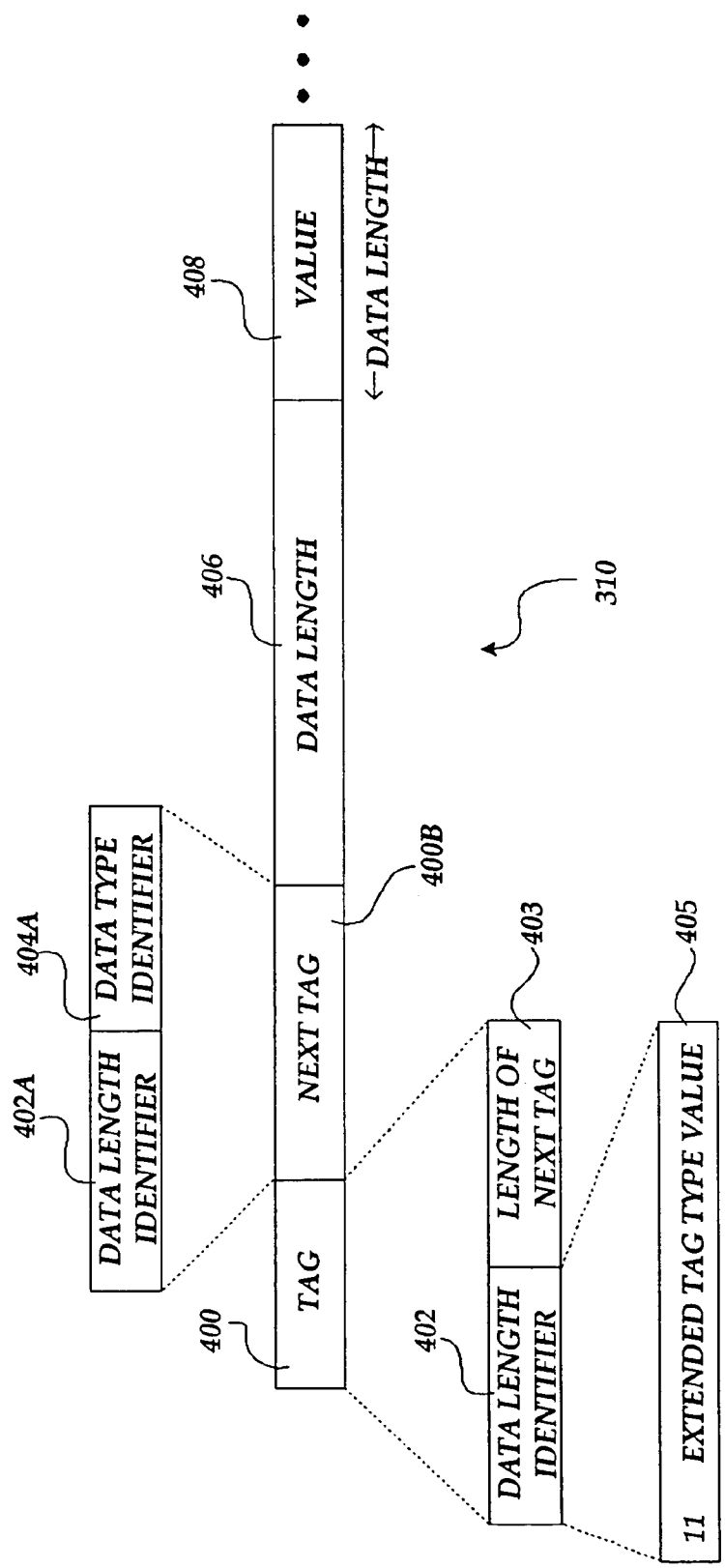
FIG. 5 is a block diagram illustrating the use of an extended tag type value in a tag-length-value encoding format in an embodiment of the present invention.

Referring now to FIG. 5, an illustrative data structure for a tag 400 having an extended tag type value 405 will be described. Where a data length identifier 402 corresponding to an extended tag type value 405 is specified, the remainder of the tag 400 is utilized to specify the length of the next tag 400B. According to an embodiment of the present invention, the data length identifier 402 comprises the first two bits of the tag 400 and the remaining six bits are utilized to specify the length of the next tag 403 in bytes. Therefore, the next tag 400B may be up to 64 bytes long. The next tag 400B follows the tag format described above with respect to FIG. 3 except that its length is defined by the length of next tag 403. Accordingly, a data length identifier 402A, a data type identifier 404A, a data length 406 and a data value 408 are also provided.

Figure 6:
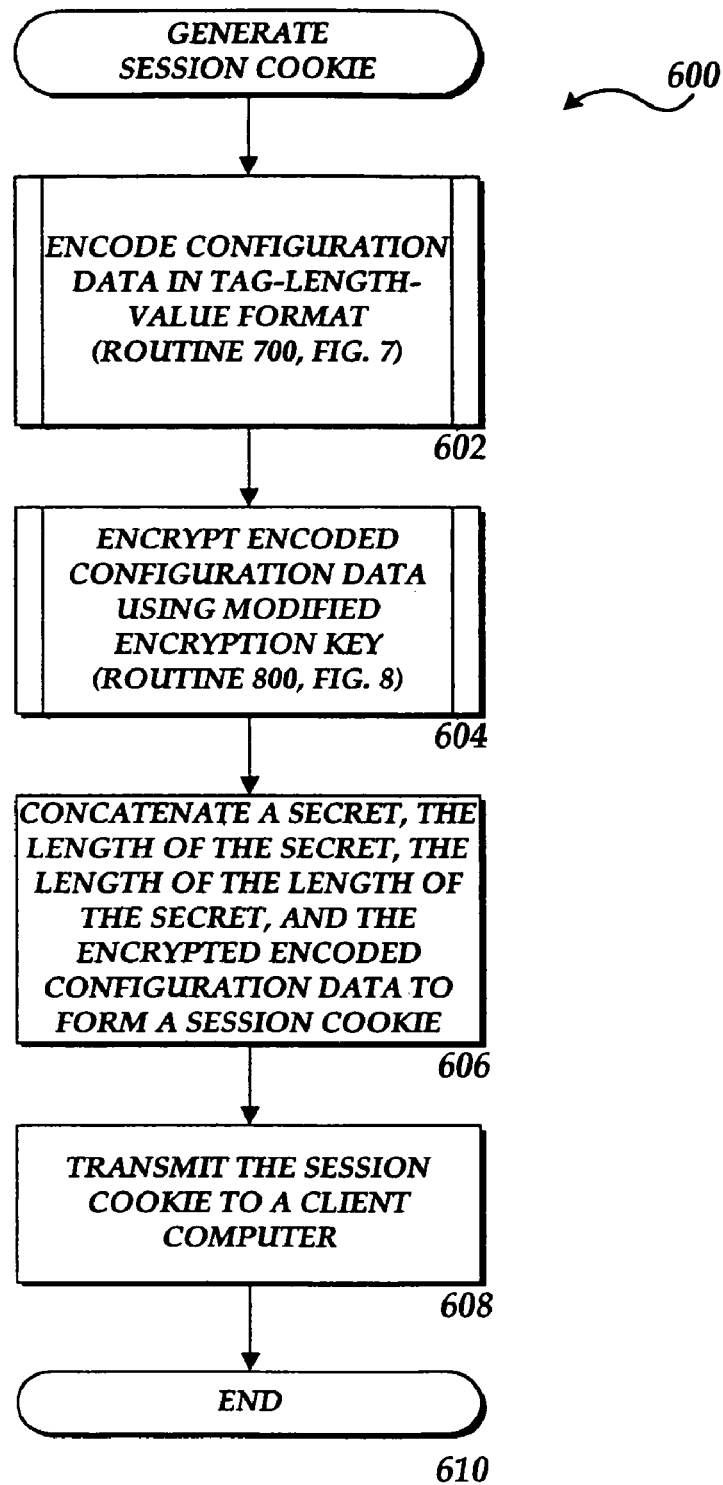
FIG. 6 is a flow diagram illustrating a routine for generating a session cookie according to an actual embodiment of the present invention.

Referring now to FIG. 6, an illustrative Routine 600 for generating a session cookie will be described. Routine 600 begins at block 602, where the session data is encoded into a tag-length-value format. An illustrative routine for encoding the configuration data in this manner is described below with reference to FIG. 7. Routine 600 continues from block 602 to block 604, where the encoded session data is encrypted using a modified encryption key. An illustrative routine for encrypting the encoded configuration data is described below with reference to FIG. 8.

From block 604, Routine 600 continues to block 606, where the session cookie is formed. The session cookie is formed by concatenating a secret, the length of the length of the secret, the length of the secret, and the encrypted encoded session data. The formation of the session cookie in this manner is described in detail above with respect to FIG. 3A. From block 606, Routine 600 continues to block 608, where the session cookie is transmitted from the Web server computer to a client computer. The client computer receives the session cookie and stores it for later retrieval. The Routine 600 then continues from block 608 to block 610, where it ends.

Figure 7:
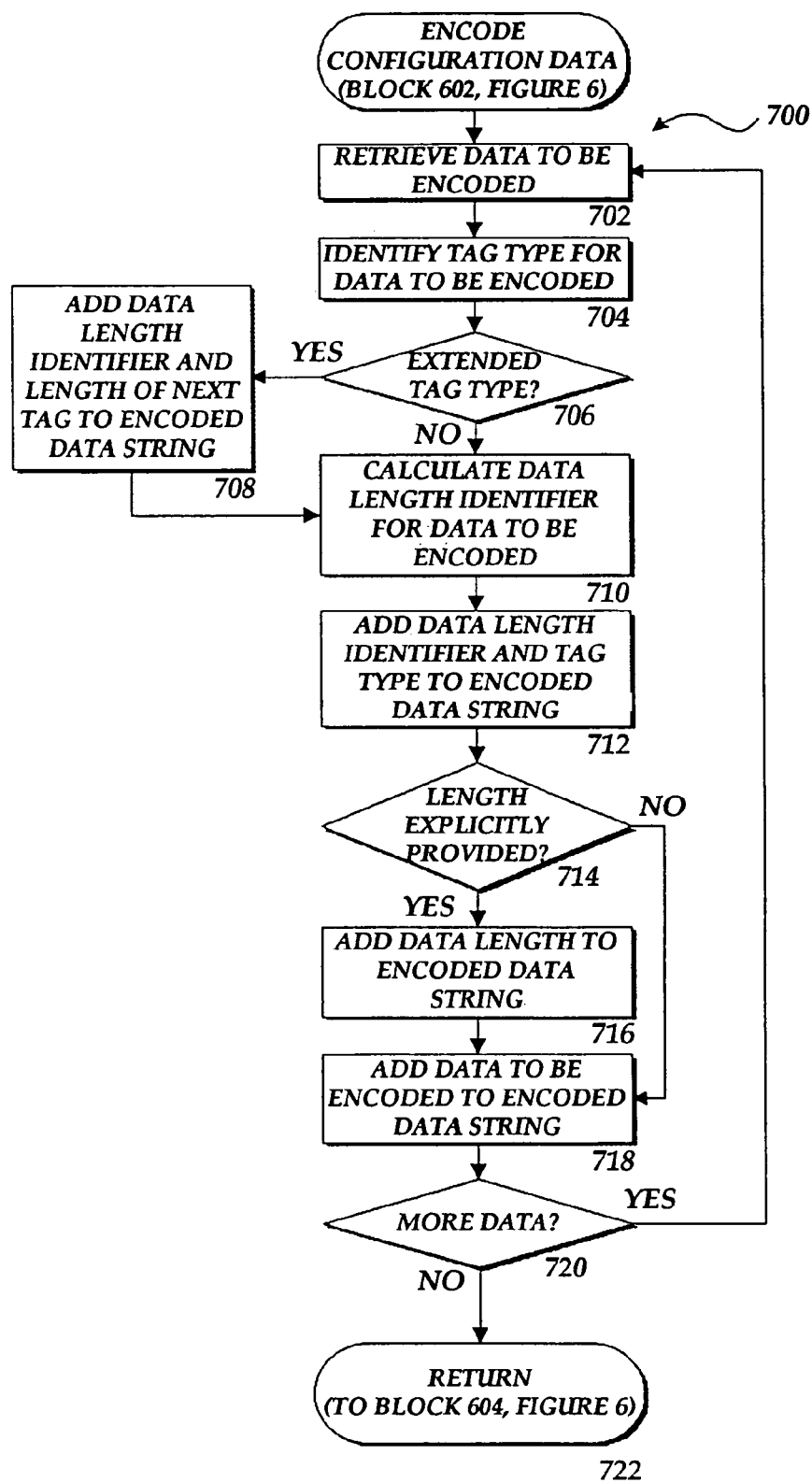
FIG. 7 is a flow diagram illustrating a routine for encoding data in a session cookie in a tag-length-value format according to an actual embodiment of the present invention.

Referring now to FIG. 7, an illustrative Routine 700 will be described for encoding session data. Routine 700 begins at block 702, where the session data to be encoded is retrieved by the Web server computer. The session data may correspond to one or more configuration settings for the Web server computer and for a particular user session. For instance, session data may indicate that the Web server computer should be configured to respond to requests received in a particular communications session in Japanese. Routine 700 continues from block 702 to block 704, where a tag corresponding to the session data is identified. As described above with respect to FIG. 4, six bit tags are predefined that correspond to the session data. From block 704, the Routine 700 continues to block 706, where a determination is made as to whether the tag corresponding to the session data is of an extended tag type. If the tag corresponding to the session data is of an extended tag type, the Routine 700 branches to block 708. At block 708, the data length identifier and the length of the next tag are added to the encoded session data. The Routine 700 then continues from block 708 to block 710.

If, at block 706, it is determined that the tag corresponding to the session data, or configuration data, is not of an extended tag type, the Routine 700 continues from block 706 to block 710. At block 710, the data length identifier for the data value is determined. Routine 700 continues from block 710 to block 712, where the data length identifier and the tag type are added to the encoded configuration data. If the data value is of a length corresponding to one of the predefined data lengths, such as one byte or four bytes, the appropriate predefined data length identifier is added to the encoded configuration data. The Routine 700 then continues from block 712 to block 714.

At block 714, a determination is made as to whether the data length is explicitly provided. If the data length is not explicitly provided, the Routine 700 branches to block 718. If the data length is explicitly provided, the Routine 700 continues to block 716, where the data length is added to the encoded configuration data. From block 716, the Routine 700 continues to block 718, where the value is added to the encoded configuration data. Once the value has been added to the encoded session data, the tag-length-value data structure for one item of server configuration data is complete. Routine 700 then continues to block 720, where a determination is made as to whether more session data remains to be encoded. If more data remains to be encoded, the Routine 700 branches to block 702. If no more data remains to be encoded, the Routine 700 continues to block 722, where it returns to block 604, shown in FIG. 6.

Figure 8:
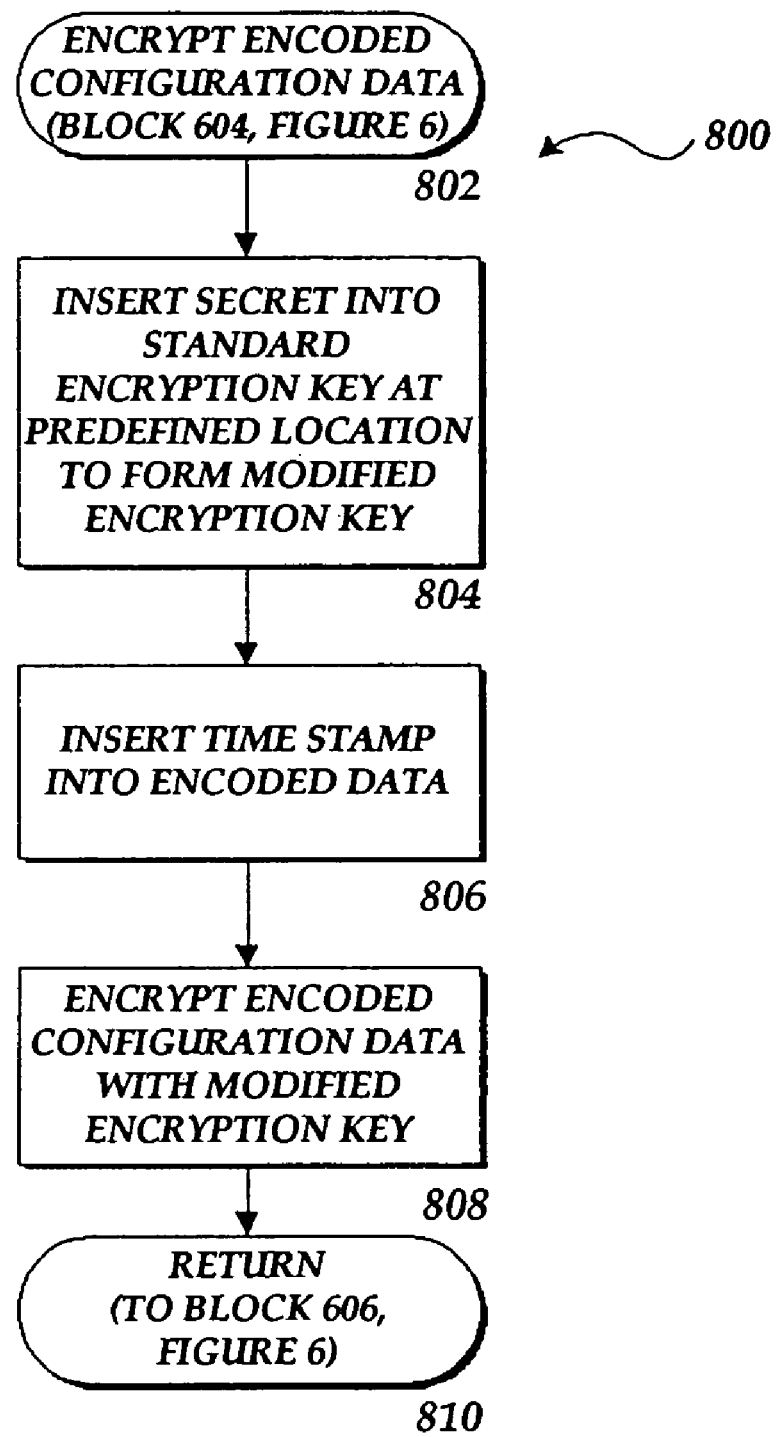
FIG. 8 is a flow diagram illustrating a routine for encrypting encoded configuration data according to an actual embodiment of the present invention.

Referring now to FIG. 8, an illustrative Routine 800 for encrypting encoded session data will be described. Routine 800 begins at block 804, where a secret is inserted into a standard encryption key at a predefined location. As described above with respect to FIG. 3B, the secret may comprise a user password, a user e-mail address, or other type of pre-selected information. Moreover, the secret may be inserted into the standard encryption key at any predefined location. From block 804, Routine 800 continues to block 806, where a time stamp is inserted into, or concatenated with, the encoded configuration data. The Routine 800 then continues from block 806 to 808, where the encoded configuration data is encrypted using the modified encryption key. Secure Socket Layer ("SSL") encryption or another encryption algorithm known to those skilled in the art may be utilized to encrypt the encoded session data. From block 808, Routine 800 continues to block 810, where it returns to block 606 shown in FIG. 6.

Figure 9:
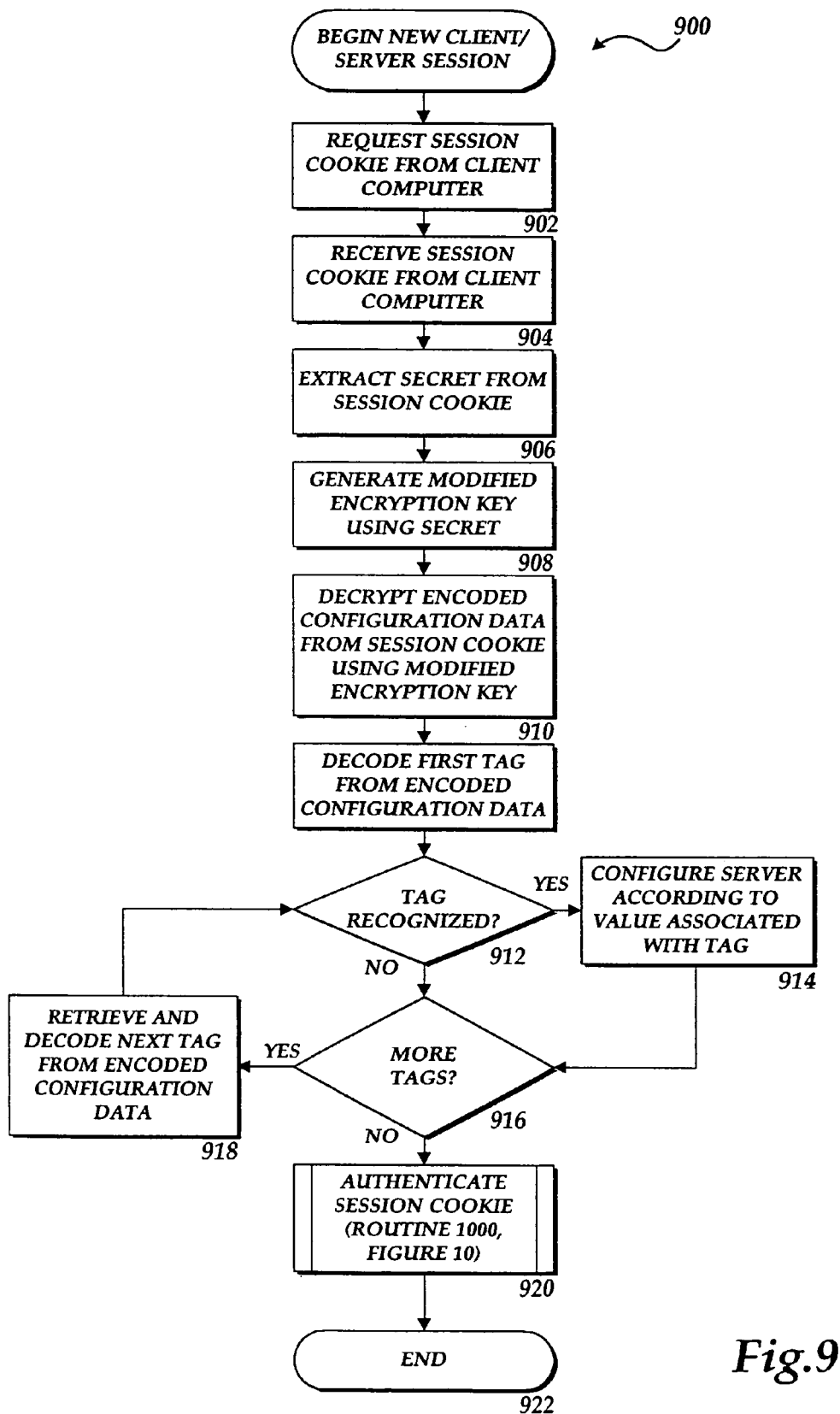
FIG. 9 is a flow diagram illustrating a routine for configuring a server computer and authenticating a communications session using session data contained in a session cookie according to an actual embodiment of the present invention.

Referring now to FIG. 9, an illustrative Routine 900 for initiating a new communications session between the client computer and the Web server computer will be described. Routine 900 begins at block 902, where the Web server computer requests the session cookie from the client computer. If the client computer does not have a session cookie, one may be generated at the Web server computer and transmitted to the client computer in the manner described above with reference to FIG. 8. If the client computer does have a session cookie, the client computer will transmit the session cookie to the Web server computer. The Web server computer then receives the session cookie from the client computer at block 904.

From block 904, the Routine 900 continues to block 906, where the Web server computer extracts the secret from the session cookie. As described above with respect to FIG. 3A, the secret, the length of the secret, and the length of the length of the secret are concatenated with the encrypted encoded session data to form the session cookie. Therefore, the secret may be extracted from the concatenated data by first decoding the length of the length of the secret and using this information to determine the length of the secret. Once the length of the secret has been determined, the secret may be extracted from the concatenated data.

From block 906, the Routine 900 continues to block 908, where the Web server computer generates the modified encryption key. The modified encryption key is formed by the Web server computer by inserting the secret into a standard encryption key maintained at the Web server computer at the predefined location. The Routine 900 then continues to block 910, where the Web server computer decrypts the encoded configuration data using the modified encryption key.

From block 910, the Routine 900 continues to block 910, where the Web server computer decodes the first tag from the encoded configuration data. The Routine 900 then continues to block 912, where the Web server computer determines whether the first tag is a valid tag. If, at block 912, the Web server computer determines that the first tag is a valid tag, the Routine 900 branches to block 914, where the Web server computer configures itself utilizing the data value associated with the tag. The Routine 900 the continues from block 914 to block 916.

If, at block 912, it is determined that the first tag is not a valid tag, the Routine 900 continues to block 916, where the Web server computer determines whether more tags exist to be decoded. If the Web server computer determines that additional tags remain to be decoded, the Routine 900 branches to block 918, where the next tag is retrieved from the encoded configuration data and decoded. The Routine 900 then continues from block 918, to block 912.

If, at block 916, the Web server computer determines that no additional tags remain to be decoded, the Routine 900 continues to block 920. At block 920, the Web server computer authenticates the session cookie. An illustrative Routine 1000 for authenticating a session cookie is described below with reference to FIG. 10. From block 920, the Routine 900 continues to block 922, where it ends.

Figure 10:
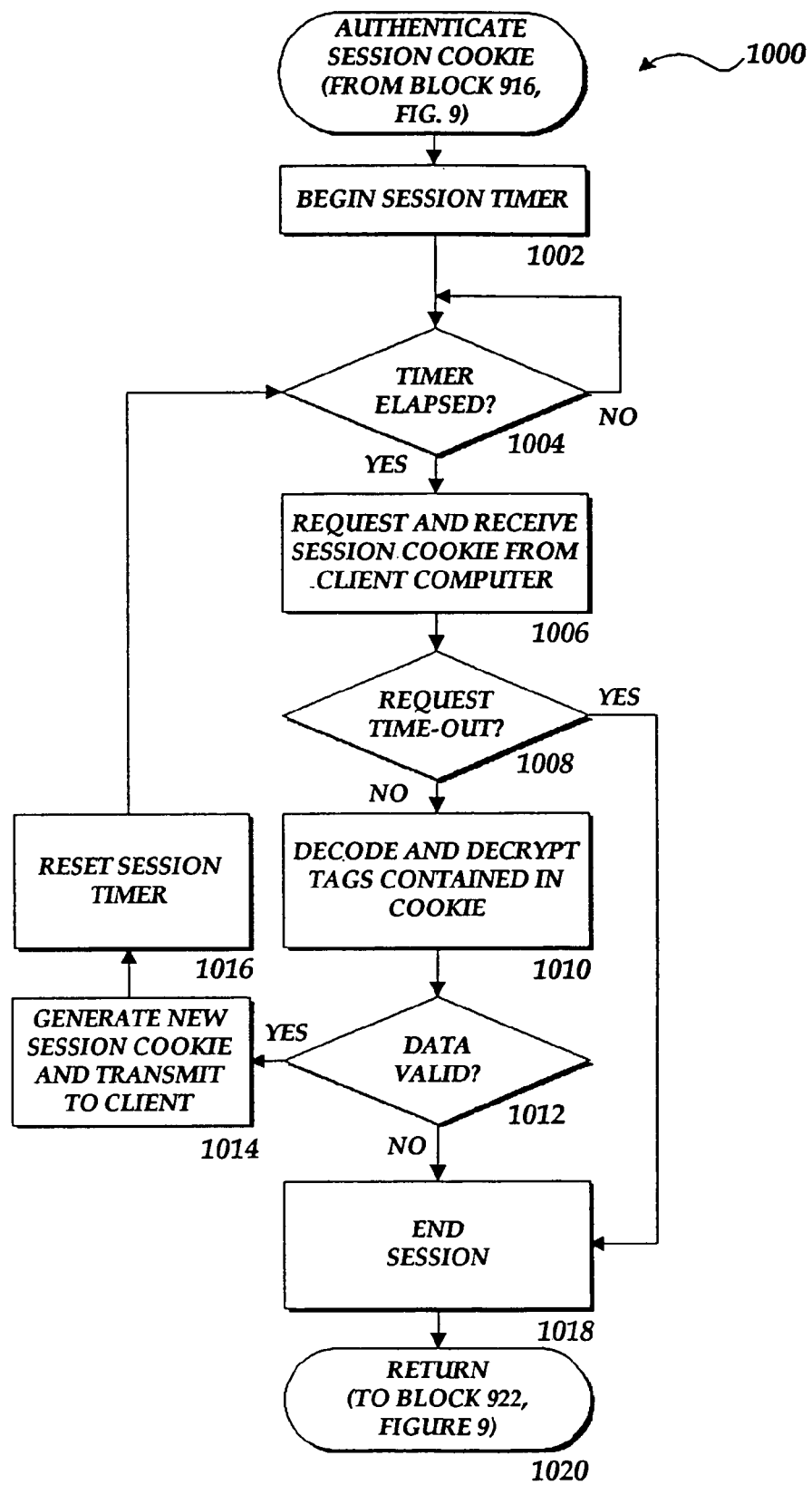
FIG. 10 is a flow diagram illustrating a routine for authenticating a session cookie according to an embodiment of the present invention.

Referring now to FIG. 10, an illustrative Routine 1000 for authenticating a session cookie will be described. Routine 1000 begins at block 1002, where a session timer is started at the Web server computer. The session timer utilizes a real time clock to determine the amount of time that has elapsed since the session timer was started. The session timer may also be set to elapse after a predetermined amount of time. From block 1002, the Routine 1000 continues to block 1004, where the Web server computer determines if the session timer has elapsed. If the session timer has not elapsed, the Routine 1000 branches back to block 1004, where another determination is made. If the session timer has elapsed, the Routine 1000 continues to block 1006, where the Web server computer requests the session cookie from the client computer.

From block 1006, the Routine 1000 continues to block 1008, where the Web server computer determines whether the client computer has responded to the request for the session cookie or whether the request has timed-out. If the request has timed-out, the Routine 1000 branches to block 1018. If the request has not timed-out, the Routine 1000 continues to block 1010. At block 1010, the Web server computer decrypts the session cookie and decodes the session data. From block 1010, the Routine 1000 continues to block 1012, where the Web server computer determines whether the session data encoded within the session cookie is valid. If the session data encoded within the session cookie is valid, the Routine 1000 branches to block 1014, where the Web server computer generates a new session cookie and transmits the new session cookie to the client computer. Routine 1000 then continues from block 1014 to block 1016 where the session timer is reset. The Routine 1000 then continues to block 1004, where the authentication process may begin again.

If, at block 1012, the Web server computer determines that the session data encoded in the session cookie is not valid, the Routine 1000 continues to block 1018, where the communications session between the Web server computer and the client computer is ended. From block 1018, the Routine 1000 continues to block 1020, where it returns to block 922, shown in FIG. 9. In this manner, the session cookie may be utilized to periodically validate the communications session between the Web server computer and the client computer.

While illustrative embodiments have been illustrated and described, it will be appreciated that various changes can be made therein without departing from the spirit and scope of the invention.

The invention claimed is:

1. A system comprising:
a server computer; and
a computer-readable medium having stored thereon a plurality of data structures, comprising:
a configuration data structure for representing encoded configuration data for use by said server computer to configure itself during a particular communication session between said server computer and a client computer, wherein said configuration data structure comprises:
a first configuration data field containing data representing a data length identifier and a tag type; and
a second configuration data field containing configuration data of said tag type and having a length described by said data length identifier;
wherein the encoded configuration data of the first and second configuration fields in encrypted using a modified encryption key to create encrypted encoded configuration data, said modified encryption key comprises a standard encryption key with a secret inserted at a predefined location; and
a cookie data structure for representing a session cookie for use by said server computer during the particular session for decrypting the session data during the particular session, wherein said cookie data structure comprises:
a first cookie data field containing the secret;
a second cookie data field containing a value that represents the length of the secret contained in the first cookie data field;
a third cookie data field containing a value that represents the length of the length of the secret contained in the second cookie data field; and
a fourth cookie data field containing the encrypted encoded configuration data;
wherein said session cookie is transmitted by said server computer to the client computer whereby the client computer creates said modified encryption key by inserting said secret extracted from said session cookie into the standard encryption key at the predefined location.

2. The system of claim 1,
wherein said configuration data structure further comprises a plurality of additional data structures comprising one of said first configuration data field and one of said second configuration data field for a plurality of tags.

3. The system of claim 2,
wherein said data length identifier comprises the first two bits of said first data field.

4. The system of claim 2,
wherein said data length identifier comprises data indicating that the length of said second data field is one byte.

5. The system of claim 2,
wherein said data length identifier comprises data indicating that the length of said second data field is four bytes.

6. The system of claim 2,
wherein said data length identifier comprises data indicating that said tag type comprises an extended tag type.

* * * * *